(12) United States Patent
Yamanaka

(10) Patent No.: US 7,791,987 B2
(45) Date of Patent: Sep. 7, 2010

(54) RECORDING TYPE OPTICAL DISC MEDIUM AND OPTICAL DISC DEVICE FOR THE SAME

(75) Inventor: Yutaka Yamanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 513 days.

(21) Appl. No.: 11/792,096

(22) PCT Filed: Dec. 7, 2005

(86) PCT No.: PCT/JP2005/022434

§ 371 (c)(1),
(2), (4) Date: Jun. 1, 2007

(87) PCT Pub. No.: WO2006/062117

PCT Pub. Date: Jun. 15, 2006

(65) Prior Publication Data

US 2008/0232205 A1    Sep. 25, 2008

(30) Foreign Application Priority Data

Dec. 9, 2004   (JP) ............................ 2004-356515

(51) Int. Cl.
*G11B 7/24* (2006.01)
(52) U.S. Cl. .............. 369/44.26; 369/47.27; 369/275.2; 369/275.4
(58) Field of Classification Search .............. 369/44.26, 369/47.27, 275.2, 275.4
See application file for complete search history.

(56) References Cited

U.S. PATENT DOCUMENTS

| 5,815,485 | A | * | 9/1998 | Tanaka et al. ............. 369/275.3 |
| 5,978,350 | A | * | 11/1999 | Tobita et al. ............. 369/275.3 |
| 6,128,272 | A |   | 10/2000 | Horimai et al. |
| 6,215,758 | B1 |  | 4/2001 | Horimai et al. |

(Continued)

FOREIGN PATENT DOCUMENTS

EP    1 065 658 A1    1/2001

(Continued)

OTHER PUBLICATIONS

Blu-Ray Disc Association: "Rewritable Blu-Ray Disc (BD-RE) Multi-media Command Set Description, Version 0.80" Internet Citation, [Online] pp. 13-14, Nov. 9, 2004.

(Continued)

*Primary Examiner*—Wayne R Young
*Assistant Examiner*—Brenda Bernardi
(74) *Attorney, Agent, or Firm*—Young & Thompson

(57) ABSTRACT

An optical disc medium (10) is provided with a data recording area (12) having the spiral recording track (11) and a lead-in area (13) composed of an embossed pit. In the lead-in area (13), information indicating a characteristic range of a signal detected by an optical head from a groove track is previously recorded. In accordance with a kind of the optical disc medium (10), even when the characteristic range of the signal detected by the optical head from the groove track is different, since the information indicating the characteristic range is previously recorded on the optical recording medium (10), tracking operation of the recording track can be performed under conditions within the characteristic range. Therefore, the tracking operation of the recording track (11) can be accurately performed to any kind of optical disc medium (10).

7 Claims, 8 Drawing Sheets

U.S. PATENT DOCUMENTS

| | | |
|---|---|---|
| 7,539,093 B2 * | 5/2009 | Iida et al. .................. 369/47.1 |
| 2002/0114027 A1 | 8/2002 | Horimai |
| 2003/0063342 A1 | 4/2003 | Horimai |
| 2003/0202436 A1 | 10/2003 | Tomita et al. |
| 2004/0001400 A1 * | 1/2004 | Amble et al. ............ 369/44.26 |
| 2004/0114493 A1 * | 6/2004 | Yamaguchi et al. ......... 369/111 |
| 2004/0184382 A1 * | 9/2004 | Horimai et al. ............. 369/103 |
| 2009/0086614 A1 * | 4/2009 | Minamino et al. ....... 369/275.4 |

FOREIGN PATENT DOCUMENTS

| | | |
|---|---|---|
| EP | 1 176 586 A2 | 1/2002 |
| JP | 10-112032 | 4/1998 |
| JP | 11-311936 | 11/1999 |
| JP | 2002-042348 | 2/2002 |
| JP | 2004-327013 | 11/2004 |
| WO | 99/44195 | 2/1999 |

OTHER PUBLICATIONS

Japanese Patent Office issued a Japanese Office Action date Feb. 23, 2010, Application 2006-546727.

JIS X 6245: 80 mm and 120 mm DVD-Recordable-Disk (DVD-R), Japanese Standards Association, 1999, pp. 20, 21, 36-39, 46-49.

* cited by examiner

FIG. 6A
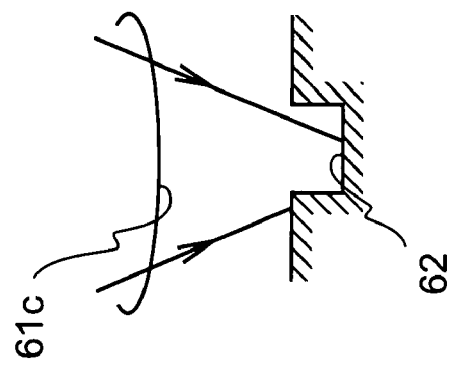
61a (CONVERGENT BEAM SPOT)
62 (PRE-GROOVE)
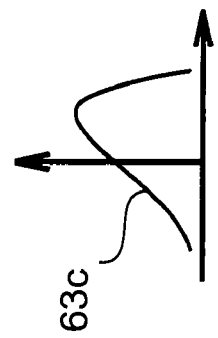
63a (REFLECTED LIGHT DISTRIBUTION)
FIG. 6B
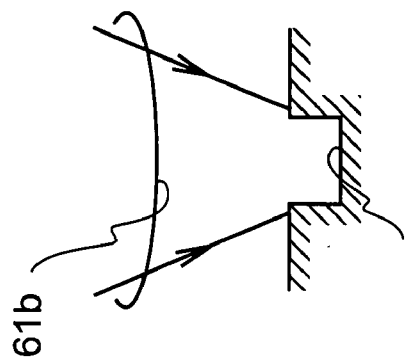
61b
62
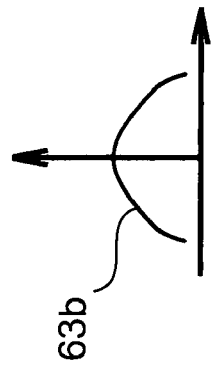
63b
FIG. 6C
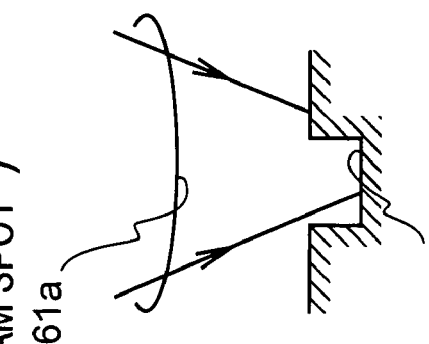
61c
62
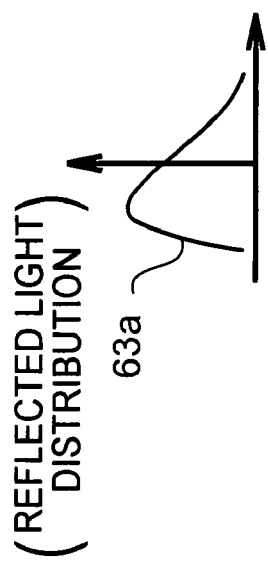
63c

RECORDING TYPE OPTICAL DISC MEDIUM AND OPTICAL DISC DEVICE FOR THE SAME

TECHNICAL FIELD

The present invention relate to an optical disc medium where data is recorded and reproduced by means of a small light spot and, in particular, to a recording type optical disc media such as CD-R/RW and DVD-R/RW, and an optical disc device which performs recording and reproduction of the same.

BACKGROUND ART

In the field of optical discs such as CDs and DVDs, CD-Rs, DVD-Rs to which data can be recorded only once, and CD-RWs, DVD-RWs, DVD-RAMs, and the like, which can be rewritten, are widely spread as the recording type optical disc media, in addition to the reproduction-only ROM media on which embossed data pit arrays are formed.

The recording type optical disc medium is created by forming a recording track constituted with a spiral pre-groove used for tracking on an optical disc substrate, and forming a multilayered recording layer made of an organic material or the like thereon. Through collecting high power laser beams on the recording layer, the recording layer is partially changed in quality to form a recording pit for recording the data thereby. With the CD-R and DVD-R, it is possible to obtain servo signals with the almost same characteristic with the same data format structure as that of the embossed ROM medium after recording. Thus, it can be easily reproduced by a reproduction-only drive device.

For example, in the case of a DVD-R, it is possible to detect a track error by a push-pull signal by using pre-groove under a non-recorded state, and to detect the track error by retardation detection signal by using the pit as in the ROM after the data is recorded.

Incidentally, in order to achieve fine recording and reproduction with an optical disc device, it is necessary to pre-record so-called control data information that indicates the type and characteristic of the optical disc medium on the recording type optical disc medium (for example, Patent Literature 1). Hereinafter, the recording type optical disc medium is simply referred to as an "optical disc medium".

As shown in FIG. 5, in a conventional optical disc medium 50, normally, an area called a lead-in area 53 is provided on the inner peripheral side of a data recording area 52 where a recording track 51 is provided. Before shipping out the optical disc 50, the control data is recorded in the lead-in area 53. The optical disc device reproduces the control data first, and performs tracking operation in the data recording area 52 thereafter.

In a DVD-R medium, for example, written as the control data information is only the simple information indicating at what speed the data can be recorded to the optical disc medium. The optical disc device can read this information, and perform the recording operation at a corresponding speed.

Patent Literature 1: Japanese Unexamined Patent Publication 2004-327013

Incidentally, in the DVD-R, the CD-R, and the like, which are widely used in general, there is set an allowable characteristic range of the optical disc medium so that the optical disc device can achieve a stable operation for the optical disc media of any manufacturers. This setting range is organized in a standard book, which serves as a standard specification common to the manufacturers of optical disc devices and manufacturers of optical disc media. For DVD-R (3.95 GB), for example, it is issued as ECMA-279 standard.

One of those set in the characteristic range as described above is a push-pull signal that is a track error detected from the pre-groove. FIG. 6 illustrates the principle for detecting the track error by the push-pull signal. As shown in FIG. 6B, when a convergent beam spot 61b is irradiated from an optical head to the center of a pre-groove 62 of the recording track, reflected light distribution 63b detected by the optical head becomes laterally symmetrical. In the meantime, as shown in FIGS. 6A and 6C, when convergent beam spots 61a, 61c are deflected on the left side or the right side with respect to the pre-groove 62, reflected light distributions 63a, 63c become laterally asymmetrical accordingly.

When those reflected light distributions 63a-63c are received by a bipartite photodetector that has a split line in the center, a difference signal of I1-I2 generated based on the two output signal I1, I2 becomes a push-pull signal. The push-pull signal becomes a track error detection signal, which indicates the position shift between the converged beam spots 61a-61c and the pre-groove 62.

FIG. 7 is a waveform chart indicating a change in the output signal of the bipartite photodetector, when the converged beam spot is shifted in a direction traversing a plurality of recording tracks. The difference signal is almost a sin wave detection signal that becomes almost zero at the center position of the track. Meanwhile, the sum signal I1+I2 obtained by adding the two output signals becomes a detection signal with less change.

When a peak value of the amplitude of the difference signal (I1-I2) is divided by a mean value of the sum signal (I1+I2) obtained at the time of traversing the track, which is expressed as follows, there is obtained a signal called a standardized push-pull signal.

$$(I1-I2)p-p/(I1+I2)DC \tag{1}$$

The range of numerical values the standardized push-pull signal can take is set by considering the operation margin of the optical disc device.

FIG. 8 is a block diagram for showing the part in the optical disc device, which performs tracking operation by the push-pull signal. In the followings, explanations will be provided by referring to FIG. 5 and FIG. 8.

Emitted beams from the laser light source 71 form a converged beam spot on the recording track 51 of the optical disc medium 50 through a lens with drive mechanism 72. The reflected light from the converged beam spot is isolated at a mirror 73 and received by a bipartite photodetector 74. Two outputs signals of the bipartite photodetector 74 generate a push-pull signal at a differential circuit 75, and this push-pull signal is sent to a servo drive circuit 76. The servo drive circuit 76 drives the lens with drive mechanism 72 in a direction orthogonal to the track in accordance with the shift amount of the detected convergent beam spot position thereby to correct the shift between the convergent beam spot and the recording track. By such an operation called a feedback servo control, tracking operation of the recording track 51 is carried out.

The important thing in such servo control is to optimize the gain of the servo drive circuit 76. If the gain is too large, the gain as the feedback loop may become too high, which may cause oscillation. Meanwhile, if the gain is too small, the gain as the feedback loop becomes insufficient, which increases the possibility of causing the tracking to be shifted off.

When the standardized push-pull signal changes, the gain as the feedback loop becomes changed. Thus, it is necessary to set the allowable range for the standardized push-pull signal, so that there is no problem generated in the operation of the optical disc device. Normally, it is so set that a change of about ±3 dB for the center gain can be permitted. Accordingly, the allowable range for the standardized push-pull signal is set in such a manner that the maximum value becomes about the twice the minimum value. For example, in the case of DVD-R under the state with no recording pit, the minimum value for the standardized push-pull signal is set as 0.22 and the maximum value as 0.44.

In the conventional CD and DVD, it is sufficient to set a single range for the push-pull signal. However, in an optical disc medium such as the one using blue laser with the wavelength of 400 nm band, for example, various recording materials such as organic types or inorganic types are to be used depending on its usage. Thus, it has become difficult to suit all the optical disc media within the double allowable range. It is possible to widen the allowable range to be more than the double value. With that, however, it becomes difficult to secure the stability of the optical disc device because of the characteristic of the servo control as described earlier.

Furthermore, there is also an issue in the conventional method for recording the control data. There is a method which also forms a recording track with the same pre-grooves as those of the data recording region, and records control data information at the manufacturer of the optical disc media before shipping the products. However, this method is costly since it requires time and work for recording it on each piece.

DISCLOSURE OF THE INVENTION

The object of the present invention therefore is to provide an optical disc medium and an optical disc device, which can perform accurate tracking operation of the recording track on any types of optical disc media and requires less time and work for recording the control data information.

The optical disc medium according to the present invention comprises a data recording area having a spiral groove track, and a control data recording area constituted with an embossed pit. Information indicating a characteristic range of a signal detected from the groove track by an optical head is recorded in the control data recording area in advance.

Since the information indicating the characteristic range is recorded in the optical disc medium in advance, it is possible to perform tracking operation of the recording track under the condition suited for the characteristic range, even if the characteristic range of the signal detected from the groove track by the optical head differs depending on the type of the optical disc. Thus, the tracking operation of the recording track can be performed accurately on any types of optical disc media. Further, the information indicating the characteristic range is recorded in the control data recording area that is constituted with the embossed pit. Thus, it can be formed at once with other information by a stamper, so that there is no time and work required for recording it.

The optical disc device according to the present invention performs recording or reproduction of data to/from the optical disc medium of the present invention through the optical head. The optical disc device comprises: a control data detecting part for detecting information indicating the characteristic range recorded in a control data recording area; a servo condition setting part for setting a servo condition in accordance with the characteristic range detected by the control data detecting part; and a servo drive part for performing servo tracking operation of a groove track in the data recording area by using the servo condition set in the servo condition setting part.

Further, in the optical disc medium of the present invention, two or more kinds of characteristic ranges for the push-pull signal may be set in advance, and identification information indicating which of the settings it is in match may be recorded therein. Furthermore, in the optical disc medium of the present invention, numerical values of the representative values regarding the characteristic ranges of the push-pull signal set in advance may be recorded as the identification information. Moreover, in the optical disc medium according to the present invention, each of the two or more kinds of the set characteristic ranges may have a common part with other set characteristic ranges. Further, in the optical disc medium of the present invention, it is desirable for the maximum value in each of the defined characteristic range to be in a range not exceeding twice the minimum value.

The optical disc device of the present invention is a device for performing recording/reproduction on an optical disc medium that comprises a data recording area having a spiral groove track and a control data recording area constituted with an embossed pit, wherein the optical disc device may perform servo tracking operation of the groove track in the data recording area by initializing the servo characteristic condition in accordance with the characteristic information, after reproducing the control data recording area and detecting the characteristic information of the signal that is detected from the grove track by the optical head.

With the present invention, it is possible to obtain an optical disc device capable of achieving stable recording/reproducing operation for a wide characteristic ranges through setting a plurality of push-pull signal characteristic ranges and writing those in the lead-in area as the information.

As described above, it is possible with the present invention to perform tracking operation of the recording track under the condition suited for the characteristic range even if the characteristic range of the signal detected from the groove track by the optical head differs depending on the type of the optical disc medium, since the information indicating the characteristic range is recorded in the optical disc medium in advance. Thus, the tracking operation of the recording track can be performed accurately on any types of optical disc media. Further, by recording the information indicating the characteristic range in the control data recording area that is constituted with the embossed pit, it can be formed at once with other information by a stamper. Thus, there is no time and work required for recording it.

Furthermore, it is possible with the present invention to perform stable recording/reproduction on the optical disc media of different characteristic ranges, without applying a major modification to the reproducing device.

BRIEF DESCRIPTION OF THE DRAWINGS

FIG. 6 An illustration for describing a method for detecting a track error with a push-pull signal;

BEST MODE FOR CARRYING OUT THE INVENTION

In the followings, embodiments of the present invention will be described in detail by referring to the accompanying drawings.

Figure 1:
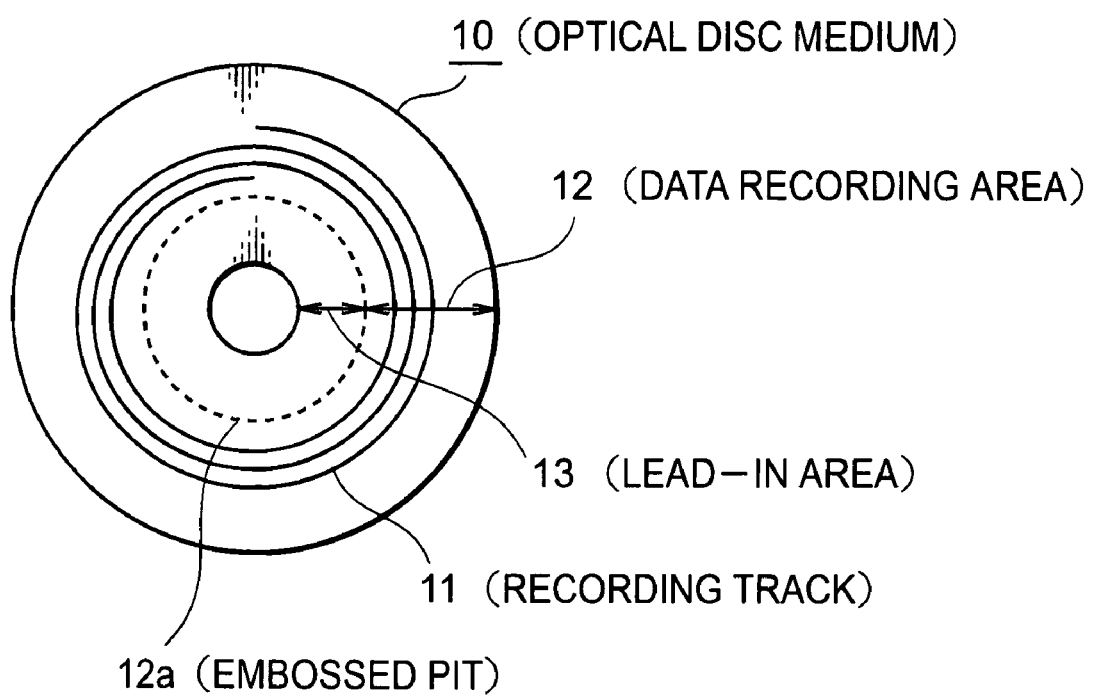
FIG. 1 A plan view for showing an embodiment of an optical disc medium according to the present invention.

As shown in FIG. 1, an optical disc medium 10 comprises a data recording area 12 having a spiral recording track 11, and an embossed pit 12a. In the embossed pit 12a, information showing the characteristic range of a signal detected by an optical head from the recording track such as a groove track is recorded in advance, for example. It is desirable for the embossed pit 12a to be provided in a lead-in area 13 that is positioned on the inner side of the recording track 11.

There is now described the case where the characteristic range of the signal detected from the grove track by the optical head varies depending on the type of the optical disc medium 10. For example, TABLE 1 shows the push-pull signals on a plurality of write-once type optical disc data recording areas measured by an optical head using a blue laser light source with the wavelength of 405 nm and an objective lens of NA 0.65, and the on-track signals indicating the reflectance ratio on the pre-groove with respect to the mirror face.

TABLE 1

Push-pull signal and On-track signal in write-once type optical disc data recording area

| Recording mode | Disc | Push-pull signal Before recording | On-track signal Before recording |
| --- | --- | --- | --- |
| Reflectance increased after recording | 1 | 0.47 | 0.79 |
|  | 2 | 0.41 | 0.74 |
| Reflectance decreased after recording | 3 | 0.49 | 0.67 |
|  | 4 | 0.36 | 0.63 |

It is noted here that the characteristic range of the push-pull signal before recording can be set from 0.35 to 0.55 for the disc whose reflectance increases after recording (for, example, from 0.30 to 0.60 as the double range by considering the fluctuation for each disc). Meanwhile, it can be set from 0.28 to 0.50 for the disc whose reflectance deteriorates after recording (for example, from 0.26 to 0.53 as the double range by considering the fluctuation for each disc).

Further, there is also a difference in the on-track signals between the discs. Thus, the information indicating the characteristic range of the on-track signal may be used, and the information indicating the characteristic range may be set by each disc but not by each recording mode of the disc. The characteristic range of the on-track signal before recording may be set from 0.40 to 0.80 as the double range by considering the fluctuation for each disc, for example, for the disc whose reflectance increases after recording. Meanwhile, it may be set from 0.50 to 1.00 as the double range by considering the fluctuation for each disc, for example, for the disc whose reflectance decreases after recording.

In this way, even when the characteristic ranges of the signals detected from the groove track by the optical head varies depending upon the type of the optical disc medium 10, it is possible to perform the tracking operation of the recording track under the condition suited for the characteristic range, since the information indicating the characteristic range thereof is recorded in the optical disc medium 10 in advance.

Therefore, tracking operation of the recording track 11 can be performed accurately on any types of optical disc media 10. Further, the information indicating the characteristic range is recorded in the lead-in area 12 that is constituted with the embossed pit. Thus, it can be formed at once with other information by a stamper, so that there is no time and work required for recording it.

With the embodiment of the present invention, even when the characteristic ranges of the signals detected by the optical head from the recording track varies, it is possible to perform the tracking operation of the recording track under the condition suited for the characteristic range, since the information indicating the characteristic ranges is recorded in the optical disc medium 10 in advance. Therefore, tracking operation of the recording track 11 can be performed accurately on any types of the optical disc media 10. Further, the information indicating the characteristic range is recorded in the lead-in area 13 that is constituted with the embossed pit. Thus, it can be formed at once with other information by a stamper, so that there is no time and work required for recording it.

The optical disc device which performs recording or reproduction of the optical disc medium 10 first reproduces the control data information written in the lead-in area 13, and supplies servo to the recording track 11 of the data recording area 12 based on the reproduced data to record or reproduce the data. If the control data within the lead-in area 13 is formed with the same embossed pit as that of a ROM, it is possible to achieve the stable information reproduction as in the ROM player device.

There is also a method which records the control data by forming a recording pit afterwards on the recording track 11 where the pre-groove is formed. However, this method generates the recording pit by each optical disc medium, so that the variations in the shapes or the like of the pits become significant compared to the embossed pits formed by using a single stamper. Therefore, stable reproduction becomes difficult depending on the medium. Further, the control data is written on the optical disc media one by one, so that the time and work required for recording becomes tremendous.

In the data recording area 12, if the recording pit is not formed, the tracking servo operation is to be performed based on the push-pull signal obtained from the pre-groove. At this time, it is necessary to know the detection level of the push-pull signal in advance and set the optimum gain of the servo drive circuit in order to perform stable track insertion and tracking operation. Conventionally, the allowable amount for the characteristic range of the push-pull signal in the above-described expression (1) is set in a standard book. Thus, the optical disc device sets the gain capable of obtaining the stable characteristic within the setting range and performs tracking operation.

If the characteristic range is larger than the assumed signal, the gain becomes too large, which may cause oscillation. Meanwhile, if the characteristic range is smaller than the assumed signal, the gain becomes too small, and this increases the possibility of causing the tracking to be shifted off. As the practical range for not inducing such unstability in the servo operation, it has been sat as the allowable range where the maximum value becomes twice the minimum value or smaller. However, it has become difficult for the cases of using the various kinds of recording materials to be suited within a single setting.

Therefore, the present invention proposes to make the entire setting range as an aggregation of a plurality of narrow setting ranges, when there requires the setting ranges of a to b for the standardized push-pull signals, where b>2 a.

Figure 2:
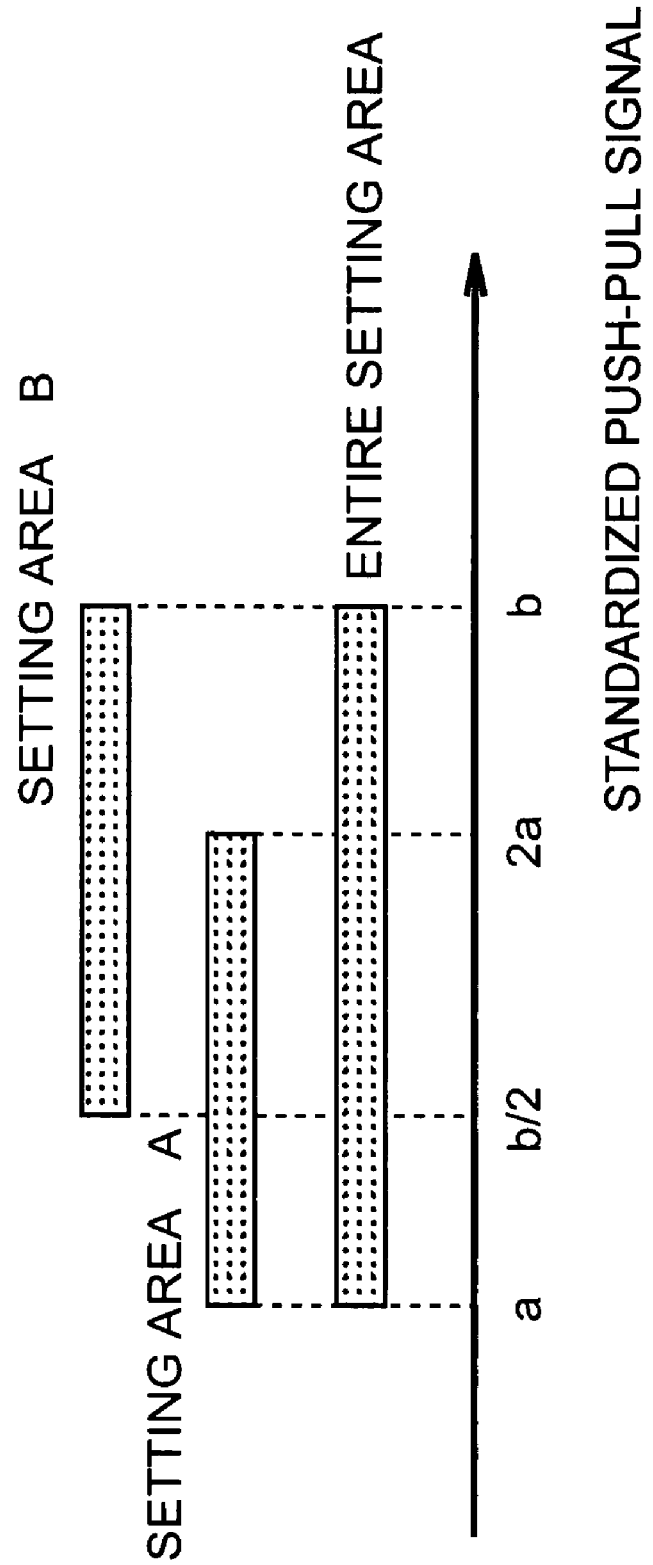
FIG. 2 An illustration for describing a characteristic range (first example) of a push-pull signal according to the embodiment.

For example, as shown in FIG. 2, when there requires a range of a to b as the entire setting range, the range from a to 2 a is set as a setting range A and the range from b/2 to b as a setting range B. With this setting, the optical disc medium 10 may be manufactured to satisfy either the setting range A or the setting range B depending on the characteristic of the materials.

Figure 3:
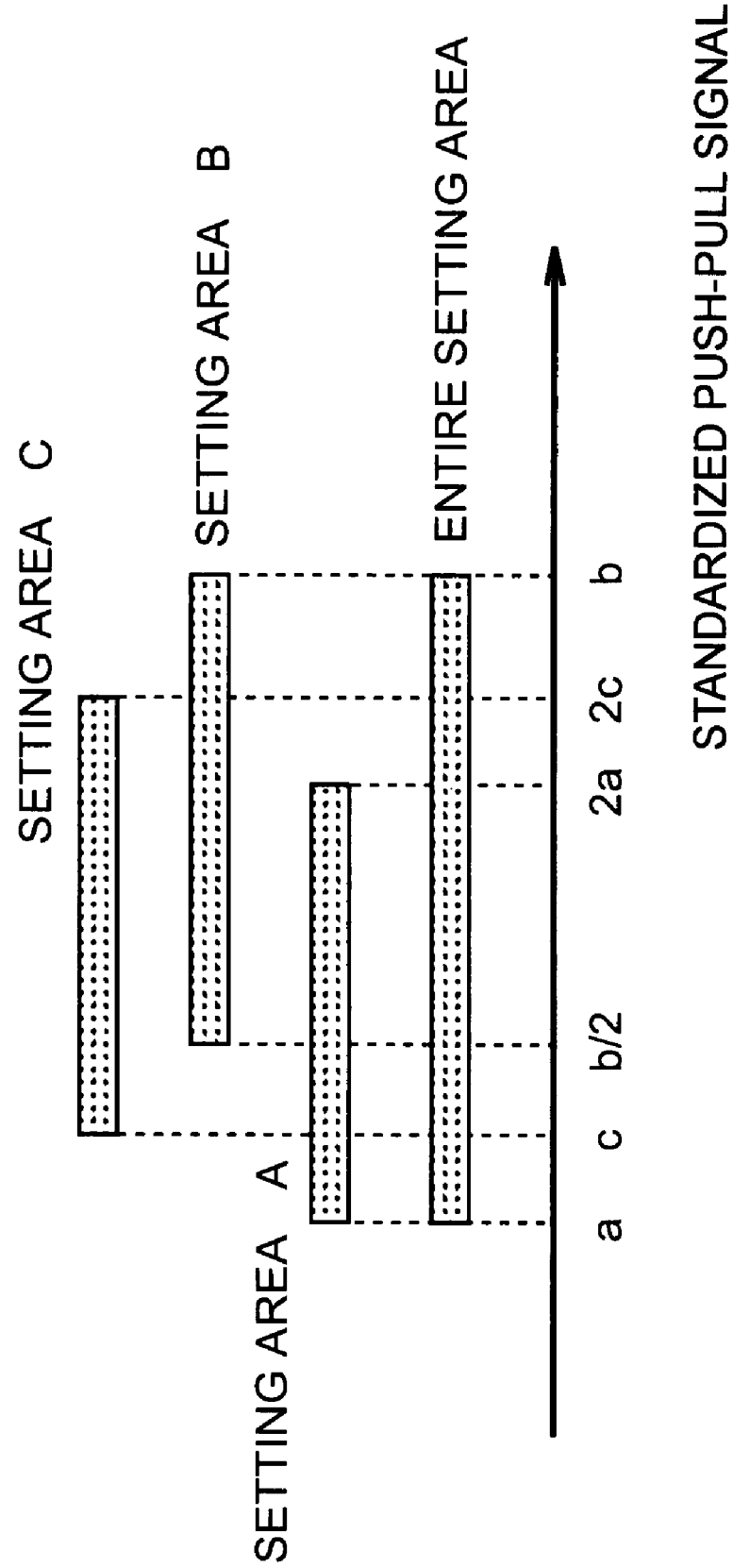
FIG. 3 An illustration for describing a characteristic range (second example) of a push-pull signal according to the embodiment.

For determining the setting range, as shown in FIG. 3, it is possible to expand the versatility of designing the optical disc medium 10 by adding a setting range C in addition. Needless to say, the individual setting range may be set as the narrower setting range having still smaller value than the double value so as to stabilize the servo operation further. Furthermore, the uniformity within a single disc face can be set separately for the optical disc media 10 which correspond to the respective setting ranges, so that it can be set narrower than the respective setting ranges. For example, the uniformity may be set as having a fluctuation of 40% or less for the mean value, whereas the setting range is set as the double value. By narrowing the uniformity in this manner, it is possible to uniformalize the servo tracking characteristic in each recording track 11 of the optical disc media 10.

As shown in FIG. 2 and FIG. 3, in the structure where the entire setting range of the standardized push-pull signal is constituted with an aggregation of narrow setting ranges A, B, and C, the entire setting range is in a range of a to b. When the narrow setting ranges A, B (C) of the information indicating the characteristics of the signals detected from the recording track of the optical disc media are a-2 a, b/2-b, respectively, it is set with a part of the narrow setting ranges A and B(C) being overlapped to shift the end parts of those ranges A, B, and C from each other.

As described above, in the case where there are a plurality of setting ranges A, B, and C set in the control data recording area 13 of the same optical disc medium 10, it is necessary for the optical disc device to know which setting the character of the optical disc medium goes along, every time a new optical disc medium is set therein. Thus, identification information for discriminating the setting ranges A, B, and C is written as the control data of the lead-in area 13 that serves as the control data recording area. The optical disc device can access to the data recording area 12 after reading out this identification information, so that it is possible to set the stable servo condition in advance.

As a way of writing the control data, there is also a method which records a flag corresponding to the setting range A and a flag corresponding to the setting range B as the data bits, respectively, for example. Further, it is also possible to write the numerical value itself that represents the setting range as the binary data. As the representative numerical values, the minimum vale or the maximum value of the range can be used. Also, it is possible to use an intermediate value such as the mean value of the minimum α and the maximum β, (α+β)/2, as the value set actually in the servo drive circuit.

Furthermore, it is also possible to use a value such as $\sqrt{(\alpha\beta)}$ which is the mean value of the ratio as the intermediate value. Moreover, it is possible to write both the minimum value and the maximum value.

Advantages of writing the numerical values in this manner may be that, even if a new setting range is added afterwards, it is possible to deal with it by directly reading out the numerical values in the optical disc device that is manufactured prior to that, etc.

For the numerical values, it is sufficient as the significant figures as long as the numerical values of two digits such as 0.22 or 0.44 can be expressed. Thus, it is sufficient to assign 6 to 8 bits for the case of binary data. Further, by allowing the notation of negative values with a complement number, it becomes possible to deal with the case where the polarities of the push-pull signal is inverted on a recording track that is not on the pre-groove but on the lands between the pre-grooves.

TABLE 2 shows the structural example of the control data having 2048 bytes as one set.

TABLE 2

Control Data Structure

| Byte position | Type of information | Number of bytes |
|---|---|---|
| 0 | Type of disc | 1 byte |
| 1 | Disc size | 1 byte |
| 2 | One-side disc or double-side disc | 1 byte |
| . | | |
| . | | |
| . | | |
| n | Push-pull signal setting range | 1 byte |
| n + 1 | Push-pull signal minimum value | 1 byte |
| . | | |
| . | | |
| 2047 | Undefined | 1 byte |

Byte "0" is the type of the disc. For example, DVD-R is expressed as 00000001b with binary data, and DVD-RW as 00000010b. Byte "2" is the disc size, in which 12 cm is expressed as 00000000b, and 8 cm as 00000001b. In byte "3", one-face disc is expressed as 00000000b, and double-face as 00000001b.

Byte "n" is a setting example according to the present invention, which is expressed as 00000000b if the setting range for the push-pull signal is A, and expressed as 00000001b if the setting range is B, for example. Byte "n+1" is the minimum value of the push-pull signal. When the second decimal place is expressed with the binary, "0.22" becomes 00010110b, for example. Meanwhile, if the polarity is inversed and the minimum value is 0.22, it can be expressed as 11101010b as the complement notation.

Other than the push-pull signal, information for setting the sum signal level is also effective as the information indicating the characteristic of the pre-groove. For example, considered are the reflectance absolute value (ratio of the reflected light quantity with respect to the incident light quantity), and an on-track light quantity which indicates reflectance ratio on the pre-groove with respect to the mirror face. Writing those setting ranges as the control data is also effective for improving the stability of the device further.

Like the push-pull signal, by setting a plurality of ranges also for the sum signal level, it is possible to expand the flexibility for selecting the materials further. Therefore, it becomes possible to utilize distinctive optical disc media such as those capable of writing at a high speed and those excellent in long-term preservative stability.

Figure 4:
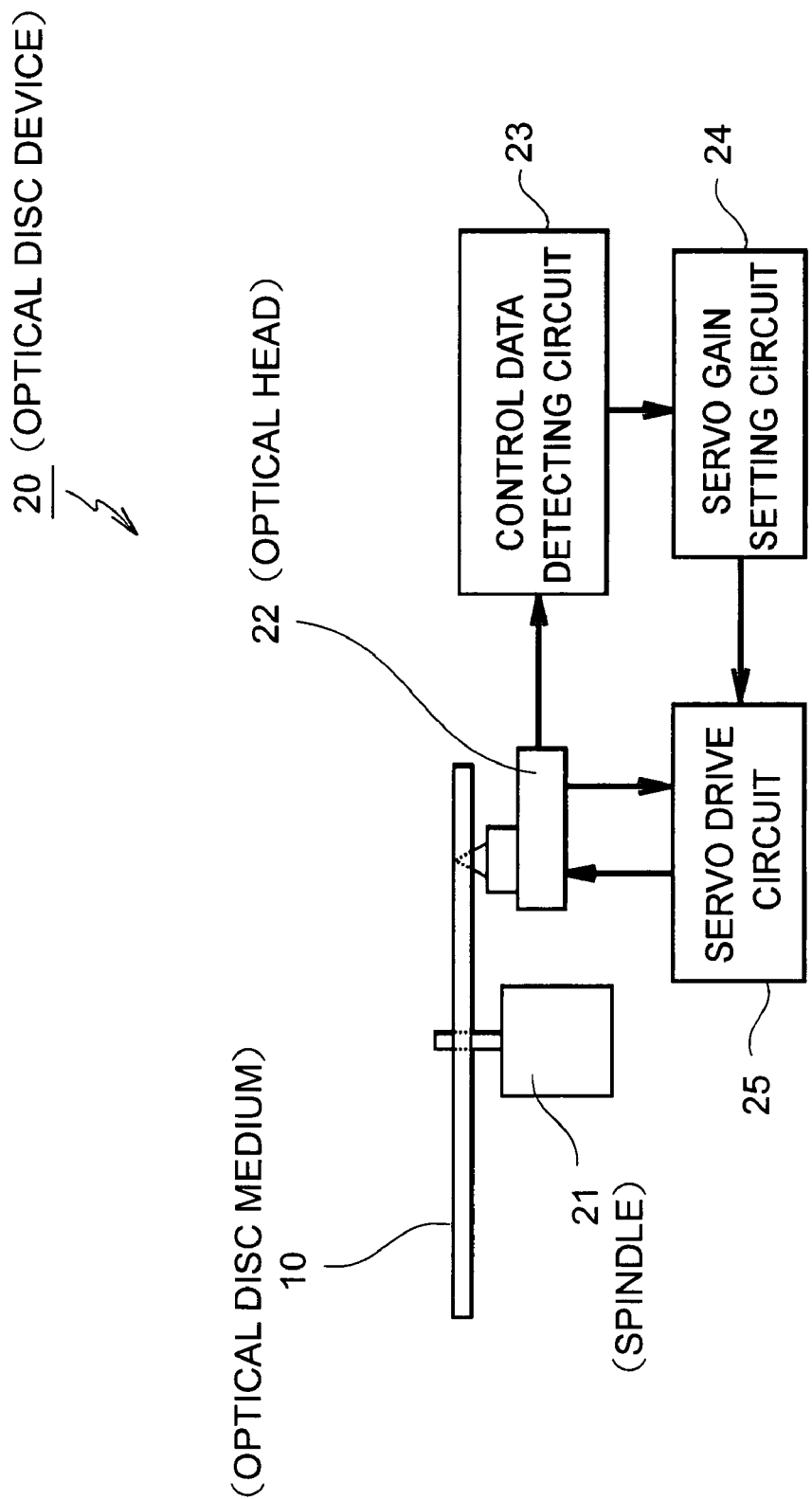
FIG. 4 A block diagram for showing an embodiment of an optical disc device according to the present invention.
Figure 5:
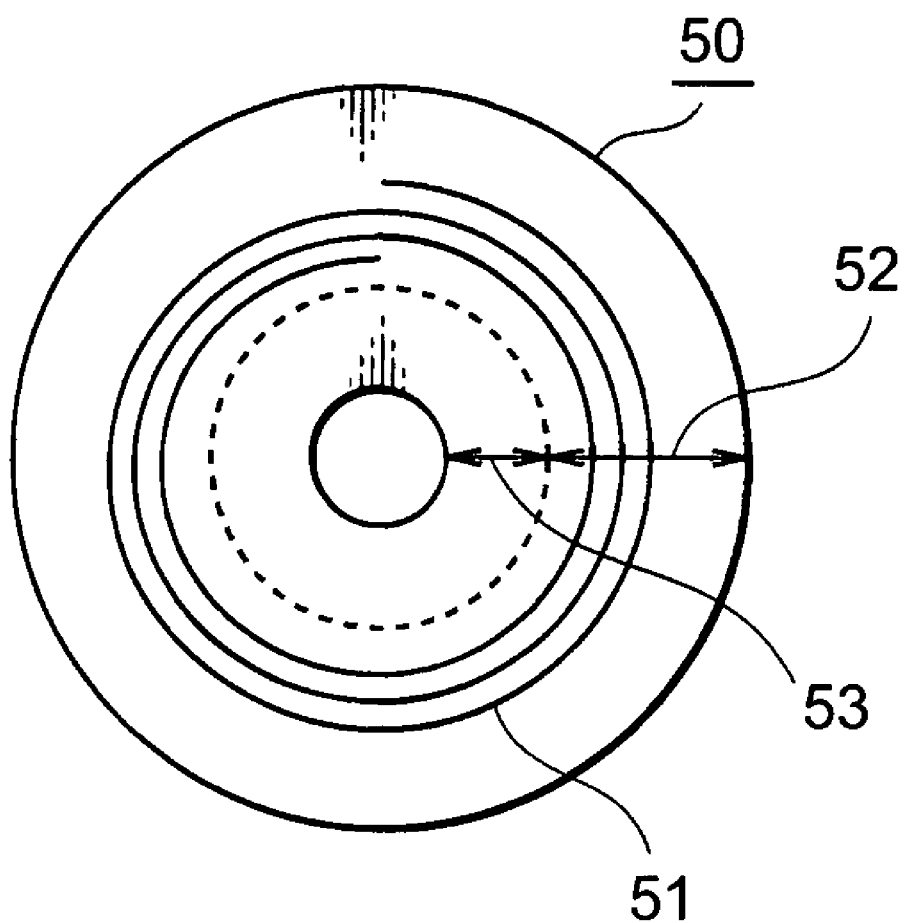
FIG. 5 A plan view for showing a conventional optical disc medium.

FIG. 4 is a block diagram for showing an embodiment of the optical disc device according to the present invention. Explanations will be provided hereinafter by referring to FIG. 1 and FIG. 4.

In an optical disc device 20, recording or reproduction of data is carried out through forming a convergent beam spot on the optical disc medium 10 set in a spindle 21 by using an optical head 22. First, the optical head 22 is brought to access to the lead-in area 13 for detecting the control data by a control data detecting circuit 23. Then, the characteristic range of the push-pull signal is judged based on the detected information, and the gain of the servo drive circuit 25 is set by a servo gain setting circuit 24. With this setting, the push-pull signal detected from the optical head 22 is inputted to the servo drive circuit 25, and the convergent beam spot position of the optical head 22 is controlled by the output signal from the servo drive circuit 25. With this, tracking operation in the data recording area 12 can be performed.

As described, through detecting the characteristic information regarding the push-pull signal in advance, stable servo operation can be achieved.

Figure 7:
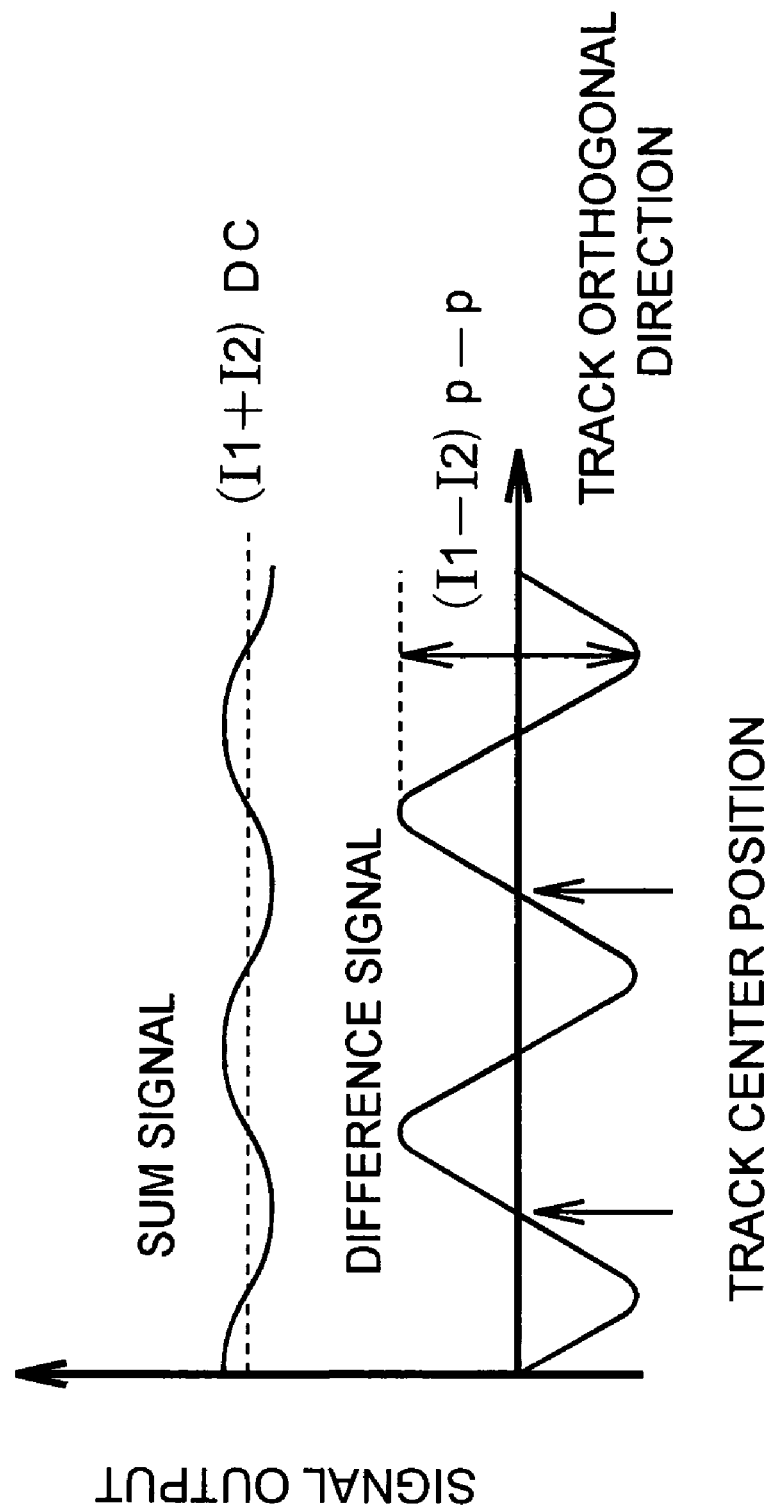
FIG. 7 A waveform chart for showing a change in the output signal of a bipartite photodetector, when a convergent beam spot is shifted in a direction traversing a plurality of recording tracks.
Figure 8:
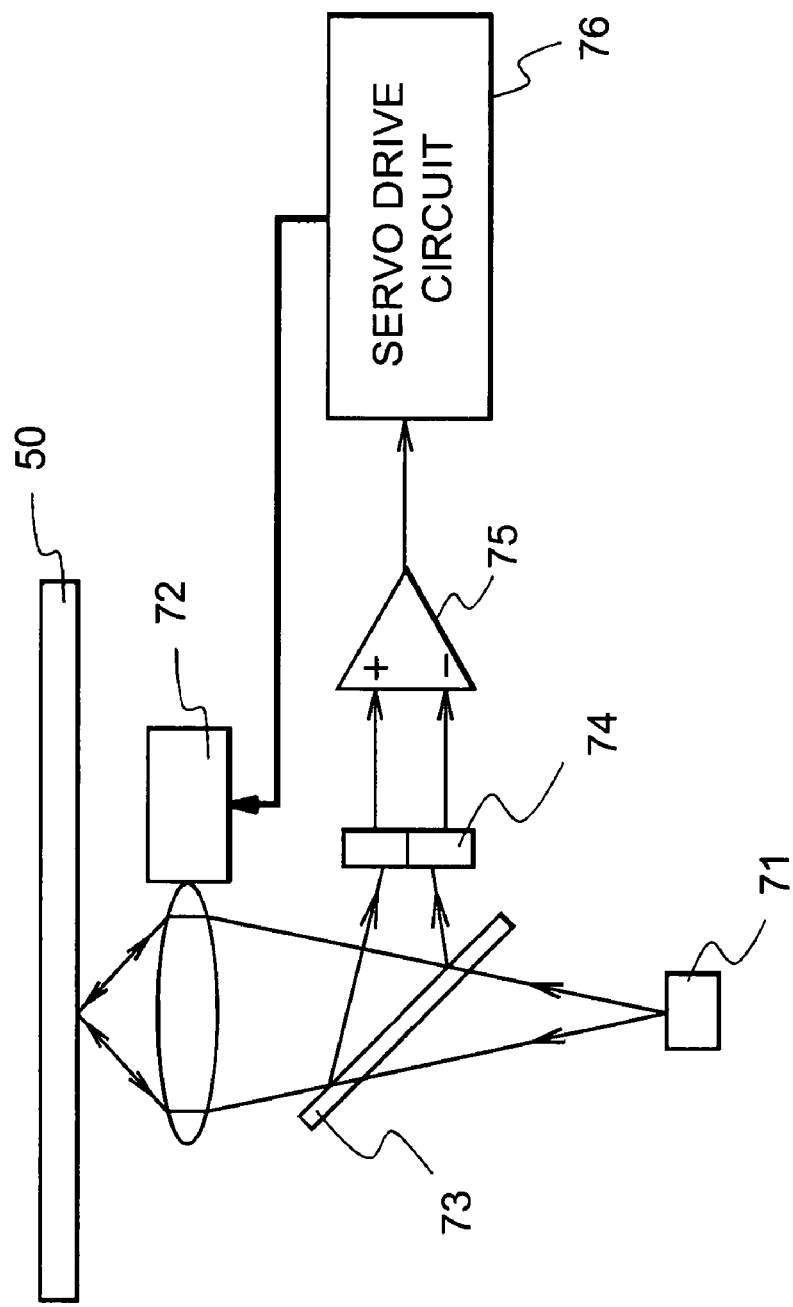
FIG. 8 A block diagram for showing a part within a typical optical disc device, which performs tracking operation by the push-pull signal.

In the explanations provided above has bee described assuming the case of the optical disc medium that uses the groove as the recording track. However, it should not be limited to that. The present invention may be applied to a land/groove medium which uses both the land and the groove as the recording track. Further, in the explanations above, the information of the push-pull signal is used as the information indicating the characteristic of the signals detected by the optical head from the recording track. However, it should not be limited to that. Instead of this push-pull signal, information indicating the level (characteristic) of the sum signal shown in FIG. 7 may be used. As the level information of the sum signal, for example, information on the reflectance absolute value (ratio of the reflected light quantity with respect to the incident light quantity) and an on-track light quantity which indicates reflectance ratio on the pre-groove with respect to the mirror face may be used, for example. Writing those characteristic ranges in the control data recording area as the control data is effective for improving the stability of the device further. When using the level information of the sum signal, it is desirable to employ the structure where a plurality of narrow setting ranges are aggregated in a single setting range, as shown in FIG. 2 and FIG. 3.

Furthermore, the present invention may be applied to the recording medium whose reflectance of the recorded pit part becomes lower than the reflectance of the unrecorded part, or to the recording medium whose reflectance of the recorded pit part becomes higher than the reflectance of the unrecorded part. When it is applied to the recording medium whose reflectance of the recorded pit part becomes higher than the reflectance of the unrecorded part, the reflectance level of the pit part at the time of recording a relatively long mark may be used as the setting for the sum signal level.

Moreover, in the case where the optical disc device obtains a track error signal not by a simple detection of the push-pull signal but by the reflected light from a plurality of convergent beam spot by forming sub-beams, the information on the setting range of the push-pull signal is effective as the reference value for the signal level. In any case, stable servo operation can be achieved by writing the control data on the optical disc medium.

INDUSTRIAL APPLICABILITY

As has been described, the present invention can provide an optical disc medium and an optical disc device, which can perform tracking operation of the recording track accurately on any types of optical disc media, and require no time and work for recording the control data information.

The invention claimed is:

1. A recording type optical disc medium, comprising:
   a data recording area having a spiral recording track, and an embossed pit, wherein
   the embossed pit functions as a control data recording area, and information indicating a characteristic range of a signal detected from the recording track by an optical head is recorded in the embossed pit,
   two or more setting ranges are provided for recording the information indicating the characteristic range, and
   a part of each of the two or more setting ranges are overlapped with each other to be arranged on the embossed pit.

2. The recording type optical disc medium as claimed in claim 1, wherein the embossed pit is formed in a lead-in area of the optical disc medium.

3. The recording type optical disc medium as claimed in claim 1, wherein the information shows a plurality of aggregated characteristic ranges of the signal.

4. The recording type optical disc medium as claimed in claim 1, wherein the information contains identification information for discriminating the characteristic ranges of the signal from each other.

5. The recording type optical disc medium as claimed in claim 1, wherein the identification information is information of numerical values, showing representative values regarding the characteristic ranges of the signal.

6. The recording type optical disc medium as claimed in claim 1, wherein the information indicating the characteristic ranges of the signal is aggregated while a part thereof being overlapped.

7. An optical disc device, comprising:
   a control data detecting part for detecting information that is recorded in a control data recording area of a recording type optical disc medium, which shows a characteristic range of a signal detected from a recording track by an optical head;
   a servo condition setting part for setting a servo condition in accordance with the characteristic range detected by the control data detecting part; and
   a servo drive part for performing servo tracking operation of a groove track in the data recording area by using the servo condition set in the servo condition setting part, wherein
   the recording type optical disc medium comprises:
   a data recording area having a spiral recording track, and an embossed pit, wherein
   the embossed pit functions as a control data recording area, information indicating a characteristic range of a signal detected from the recording track by an optical head is recorded in the embossed pit,
   two or more setting ranges are provided for recording the information indicating the characteristic range, and
   a part of each of the two or more setting ranges are overlapped with each other to be arranged on the embossed pit.

* * * * *